(12) United States Patent
Kojo et al.

(10) Patent No.: US 8,795,044 B2
(45) Date of Patent: Aug. 5, 2014

(54) DEVICE FOR PROVIDING A GAME

(71) Applicant: DeNA Co., Ltd., Tokyo (JP)

(72) Inventors: Taku Kojo, Tokyo (JP); Kazuyoshi Shiobara, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 13/900,783

(22) Filed: May 23, 2013

(65) Prior Publication Data

US 2013/0337918 A1 Dec. 19, 2013

(30) Foreign Application Priority Data

Jun. 8, 2012 (JP) ................................. 2012-130900

(51) Int. Cl.
*A63F 13/06* (2006.01)
*A63F 13/12* (2006.01)

(52) U.S. Cl.
CPC ....................................... *A63F 13/12* (2013.01)
USPC .......... 463/1; 463/40; 463/41; 463/42; 463/43

(58) Field of Classification Search
CPC .............. A63F 13/06; A63F 2001/008; A63F 2300/807; A63F 2300/5533
USPC .................................................. 463/1, 40–43
See application file for complete search history.

(56) References Cited

U.S. PATENT DOCUMENTS

| | | | | |
|---|---|---|---|---|
| 6,961,055 B2 * | 11/2005 | Doak et al. | ..................... | 345/419 |
| 2001/0034267 A1 * | 10/2001 | Toyama et al. | ................. | 463/31 |
| 2002/0169617 A1 * | 11/2002 | Luisi | ........................... | 704/275 |
| 2010/0035689 A1 * | 2/2010 | Altshuler et al. | ............... | 463/39 |
| 2011/0237333 A1 | 9/2011 | Otomo et al. | .................... | 463/42 |
| 2012/0064969 A1 | 3/2012 | Uchibori | ......................... | 463/29 |
| 2012/0142429 A1 * | 6/2012 | Muller | ............................. | 463/42 |
| 2012/0290949 A1 * | 11/2012 | Elenzil et al. | ................. | 715/753 |

FOREIGN PATENT DOCUMENTS

| | | |
|---|---|---|
| JP | 2010/124906 | 6/2010 |
| JP | 2012/061060 | 3/2012 |

OTHER PUBLICATIONS

Japanese Office Action in connection with Japanese Patent Application No. 2012-130900 issued on Sep. 7, 2012.
Japanese Office Action in connection with Japanese Patent Application No. 2012-130900 issued on Dec. 11, 2012.
Japanese Office Action in connection with Japanese Patent Application No. 2012-130900 issued on Mar. 12, 2013.

(Continued)

*Primary Examiner* — Sunit Pandya
*Assistant Examiner* — Jasson Yoo
(74) *Attorney, Agent, or Firm* — Pillsbury Winthrop Shaw Pittman LLP (57) ABSTRACT

One object is to provide a video game that implements a team battle where players can share a sense of unity. In accordance with one aspect, a server device according to an embodiment includes: an identification unit configured to identify specific players constituting a specific team and identify game contents owned by the specific players from game contents; a generation unit configured to generate a specific game content group for the specific team by using specific game contents selected from game contents owned by the specific players; and a battle processing unit configured to process a battle between an opponent and the specific team, wherein the battle processing unit compares an opponent evaluation value calculated using a characteristic value assigned to a game content owned by the opponent, with a self-evaluation value calculated using a characteristic value assigned to a specific game content included in the specific game content group.

10 Claims, 10 Drawing Sheets

(56) References Cited

OTHER PUBLICATIONS

"Sengoku Royale" http://sngk.mbga.jp/_sngk_to retrieved May 29, 2012.

Statement of Certificate of Exception to Lack of Novelty in connection with Japanese Patent Application No. 2012-130900, May 24, 2012.

* cited by examiner

| Player Name | Player Identification |
|---|---|
| P1 | P001 |
| P2 | P002 |
| P3 | P003 |
| P4 | P004 |
| P5 | P005 |
| ... | ... |

Fig. 4

| Team Name | Team Identification | Identifications of Players Constituting the Team |
|---|---|---|
| T1 | T001 | P001, P010, P032, P052, P066, ...... |
| T2 | T002 | P002, P012, P022, P082, P099, ...... |
| T3 | T003 | P003, P014, P035, P044, P088, ...... |
| T4 | T004 | P004, P020, P030, P040, P050, ...... |
| ... | ... | ... |

Fig. 5

| Player Name | Player Identification | Card C1 (C001) | Card C2 (C002) | Card C3 (C003) | Card C4 (C004) | ... |
|---|---|---|---|---|---|---|
| P1 | P001 | P001C001 | P001C002 | 00000000 | P001C004 | ... |
| P2 | P002 | P002C001 | 00000000 | P002C003 | 00000000 | ... |
| P3 | P003 | 00000000 | P003C002 | 00000000 | P003C004 | ... |
| P4 | P004 | P004C001 | 00000000 | P004C003 | P004C004 | ... |
| ... | ... | ... | ... | ... | ... | ... |

Fig. 6

| Card Identification | Name | Level | Offensive Value | Physical Strength Value | Rarity Value | Attribute Value | ... |
|---|---|---|---|---|---|---|---|
| P001C001 | Soldier A | 5 | 10 | 20 | Normal+ | Water | ... |
| P001C002 | Soldier B | 3 | 20 | 15 | Normal | Fire | ... |
| ... | ... | ... | ... | ... | ... | ... | ... |
| P002C001 | Soldier A | 12 | 85 | 70 | Normal+ | Soil | ... |
| ... | ... | ... | ... | ... | ... | ... | ... |
| P002C020 | Wizard A | 5 | 2 | 15 | Rare | Water | ... |
| ... | ... | ... | ... | ... | ... | ... | ... |
| P003C001 | Soldier A | 22 | 90 | 80 | Normal+ | Soil | ... |
| ... | ... | ... | ... | ... | ... | ... | ... |
| P003C052 | Playboy | 1 | 5 | 2 | Rare+ | Fire | ... |
| ... | ... | ... | ... | ... | ... | ... | ... |
| P004C001 | Soldier A | 1 | 2 | 5 | Normal+ | Water | ... |
| ... | ... | ... | ... | ... | ... | ... | ... |

Fig. 7

| Player Identification | Player Deck Identification | Card Identifications Constituting the Player Deck |
|---|---|---|
| P001 | PD001001 | P001C001, P001C012, P001C025, P001C026, P001C027, P001C035, P001C052, P001C085, P001C098, P001C102 |
| P002 | PD002001 | P002C005, P002C015, P002C035, P002C052, P002C085, P002C099, P002C102, P002C112, P002C185, P002C193 |
| ... | ... | ... |

Fig. 8

| Team Identification | Team Deck Identification | Card Identifications Constituting the Team Deck |
|---|---|---|
| T001 | TD001001 | P001C001, P010C005, P032C015, P052C052, P066C005, P082C016, P098C023, P123C054, P134C010, P135C082 |
| T002 | TD002001 | P002C005, P012C025, P022C012, P082C001, P099C112, P111C023, P113C045, P139C001, P142C023, P158C002 |
| ... | ... | ... |

DEVICE FOR PROVIDING A GAME

CROSS-REFERENCE TO RELATED APPLICATIONS

This application is based on and claims the benefit of priority from Japanese Patent Application Serial No. 2012-130900 (filed on Jun. 8, 2012), the contents of which are hereby incorporated by reference in their entirety.

TECHNICAL FIELD

The present invention relates to a device for providing a video game.

BACKGROUND

Social games according to related arts include a known video game wherein players battle with each other by using a concept of "deck" ("Sengoku Royale," [online], Apr. 20, 2010, DeNA Co., Ltd., [Searched on May 29, 2012], the Internet, <URL:http://sngk.mbga.jp/_sngk_top>). A deck is a game content group constituted by a plurality of game contents (such as character cards) selected from game contents owned by a player, and the game content group is used by the player. The strength of a deck is determined based on, for example, characteristic values (e.g., offensive power and defensive power) assigned to each game content constituting the deck and combination of game contents constituting the deck (e.g., special abilities produced by affinity and combination). Additionally, teams each including a plurality of players can battle with each other (team battle).

SUMMARY

However, a team battle in the above related art is basically performed individually between each player representing one team and each player representing the other team by using their own decks. The outcome of the entire team battle is determined in accordance with the numbers of wins and losses of the one-to-one battles. Therefore, in such a team battle, players included in the same team are less likely to share a sense of unity as comrades.

To overcome this problem, various embodiments of the present invention provide a video game that implements a team battle in which players can share a sense of unity.

A server device according to an embodiment of the present invention comprises: an identification unit configured to identify specific players constituting a specific team and identify game contents owned by the specific players from game contents; a first generation unit configured to generate a team-use specific game content group for the specific team by using specific game contents selected from game contents owned by the specific players; a second generation unit configured to generate a player-use specific game content group for each specific player by using specific game contents selected from game contents owned by the specific players; and a battle processing unit configured to process a battle between an opponent and the specific team, wherein the battle processing unit compares an opponent evaluation value calculated by a first rule using a characteristic value assigned to a game content owned by the opponent, with a self-evaluation value calculated using a characteristic value assigned to a specific game content included in the team-use specific game content group, thereby to process a first battle stage between the opponent and the specific team, and the battle processing unit further compares an opponent evaluation value calculated by a second rule using a characteristic value assigned to a game content owned by the opponent, with a self-evaluation value calculated using a characteristic value assigned to a specific game content included in the player-use specific game content group, thereby to process a second battle stage between the opponent and the specific team.

A method using a computer according to an embodiment of the present invention comprises the steps of: identifying specific players constituting a specific team and identifying game contents owned by the specific players from game contents; generating a team-use specific game content group for the specific team by using specific game contents selected from game contents owned by the specific players; generating a player-use specific game content group for each specific player by using specific game contents selected from game contents owned by the specific players; and processing a battle between an opponent and the specific team, wherein an opponent evaluation value calculated by a first rule using a characteristic value assigned to a game content owned by the opponent is compared with a self-evaluation value calculated using a characteristic value assigned to a specific game content included in the team-use specific game content group, thereby to process a first battle stage between the opponent and the specific team; and an opponent evaluation value calculated by a second rule using a characteristic value assigned to a game content owned by the opponent is compared with a self-evaluation value calculated using a characteristic value assigned to a specific game content included in the player-use specific game content group, thereby to process a second battle stage between the opponent and the specific team.

Various embodiments of the present invention provide a video game that implements a team battle in which players can share a sense of unity.

DESCRIPTION OF EXAMPLE EMBODIMENTS

Various embodiments of the present invention will be described hereinafter with reference to the appended drawings. In the drawings, the same components are denoted by the same reference numerals.

Figure 1:
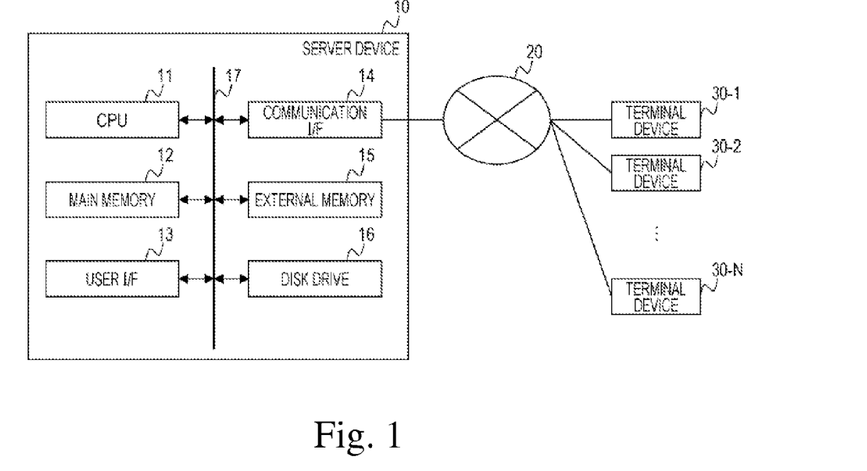
FIG. 1 is a block diagram schematically illustrating the architecture of a game system according to an embodiment 1 of the present invention.

FIG. 1 is a block diagram schematically illustrating the architecture of a game system according to an embodiment of the present invention. As illustrated in FIG. 1, an online game server device 10 (hereinafter also referred to simply as the "server device 10") may be communicatively connected to a plurality of terminal devices 30-1, 30-2, . . . , and 30-N (hereinafter also collectively referred to as the "terminal devices 30"), each having a communication function, via a communication network 20 such as the Internet. The server device 10 is an example of a device implementing part or all of a game system according to an embodiment of the present invention.

As illustrated in FIG. 1, the server device 10 may include a central processing unit (CPU) 11, a main memory 12, a user interface (I/F) 13, a communication I/F 14, an external memory 15, and a disk drive 16, and these components may be electrically connected to one another via a bus 17. The CPU 11 may load an operating system and various programs for controlling the progress of an online game into the main memory 12 from the external memory 15, and may execute commands included in the loaded programs. The main memory 12 may be used to store a program to be executed by the CPU 11, and may be formed of, for example, a dynamic random access memory (DRAM).

The user I/F 13 may include, for example, an information input device such as a keyboard or a mouse for accepting an input from an operator, and an information output device such as a liquid crystal display for outputting calculation results of the CPU 11. The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the terminal device 30 via the communication network 20.

The external memory 15 may be formed of, for example, a magnetic disk drive, and store various programs such as a game program for allowing the terminal device 30 to execute an online game and a control program for controlling the progress of the online game. The game program may be created using, for example, Adobe Flash™, which is a format developed by Adobe Systems Incorporated to handle moving images, games, and the like. The game program created using Adobe Flash™ may be stored in the external memory 15 as a small web format (SWF) file. The game program will be described later. The disk drive 16 may read data stored in a storage medium such as a compact disc read only memory (CD-ROM), digital versatile disc read only memory (DVD-ROM), or DVD Recordable (DVD-R) disc, or writes data to such a storage medium. For example, data of a game program or the like stored in a storage medium may be read by the disk drive 16, and may be installed into the external memory 15.

The terminal device 30 may be any information processing device capable of executing and operating a game program stored on the server device 10 and displayed on a web browser, non-limiting examples of the terminal device 30 including a mobile phone, a smartphone, a game console, a personal computer, a tablet, or an electronic book reader. Additionally, the terminal device 30 may be capable of receiving a game program from the server device 10 through a communication I/F 34 (described later) for executing the game.

Figure 2:
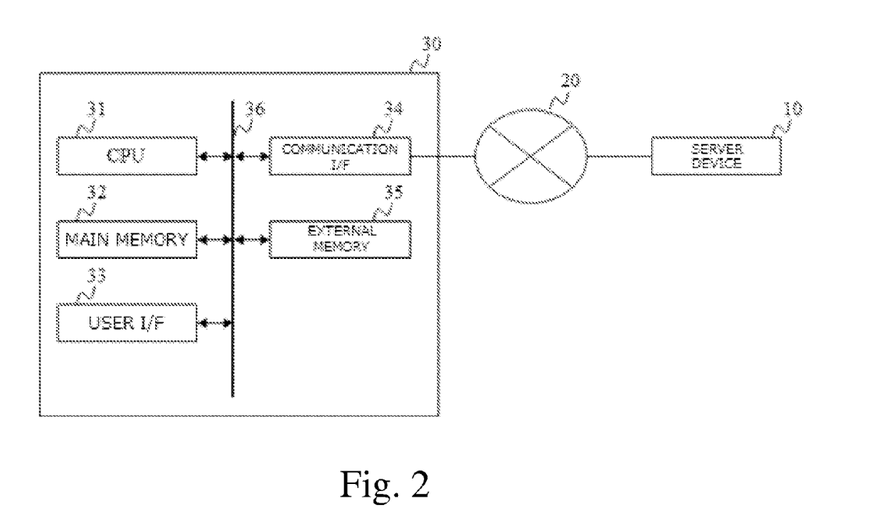
FIG. 2 is a block diagram schematically illustrating the architecture of a terminal device 30 according to an embodiment of the present invention.

The architecture of these various terminal devices 30 will be described with reference to FIG. 2. FIG. 2 is a block diagram schematically illustrating the architecture of a terminal device 30 according to an embodiment of the present invention. As illustrated in FIG. 2, the terminal device 30 may include a central processing unit (CPU) 31, a main memory 32, a user interface (I/F) 33, a communication I/F 34, and an external memory 35, and these components may be electrically connected to one another via a bus 36.

The CPU 31 may load various programs such as an operating system into the main memory 32 from the external memory 35, and may execute commands included in the loaded programs. The main memory 32 may store a program to be executed by the CPU 31, and may be formed of, for example, a dynamic random access memory (DRAM).

The user I/F 33 may include, for example, an information input device such as a touch panel, a keyboard, a button, and a mouse for accepting an input from a player (user), and an information output device such as a liquid crystal display for outputting calculation results of the CPU 31. The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the server device 10 via the communication network 20.

The external memory 35 may comprise, for example, a magnetic disk drive or a flash memory and store various programs such as an operating system. When receiving a game program from the server device 10 via the communication I/F 34, the external memory 35 may store the received game program.

The terminal device 30 having such architecture may be provided with, for example, browser software for interpreting a hypertext markup language (HTML) file and displaying a screen, and plug-in software (e.g., Flash Player distributed by Adobe Systems Incorporated) incorporated in the browser software. The terminal device 30 may acquire an SWF file embedded in an HTML file from the server device 10, and execute the SWF file using the browser software and plug-in software, and therefore the user of the terminal device 30, or a game player, may be provided with a gaming function.

A game program will now be described with reference to FIGS. 1 and 2. The game program may be stored on the external memory 15 of the server device 10 in various forms. For example, the game program may be provided as a piece of application software executable on various application execution platforms. The player is able to execute or operate a game application using the terminal device 30.

The external memory 15 of the server device 10 may store game programs for executing or operating various games executable or operable on the terminal device 30. The game programs may be created using, for example, script languages such as ActionScript™ and JavaScript™, or object-oriented programming languages such as Objective-C™ and Java™. The game programs may be executed and/or operated on a platform installed on the terminal device 30. A game program to be stored on the external memory 15 may be produced by modifying a web page created in a markup language such as HTML5 by using a style sheet such as Cascading Style Sheet 3 (CSS3). Such a web page created in a markup language may be executed or operated by the browser software installed on the terminal device 30. The external memory 15 of the server device 10 may store a desired number of game programs, and a game program for executing and/or operating a game selected by the terminal device 30 may be provided to a desired number of terminal devices 30 via the communication I/F 14 in accordance with control of the CPU 11. In the terminal device 30, the game program sent from the server device 10 may be received via the communication I/F 34 and may be transferred to the external memory 35 for storage in accordance with control of the CPU 31.

The user of the terminal device 30 may execute or operate the game program to play various games such as action games, role-playing games, interactive baseball games, and card games. The types of the games implemented by the game program are not limited to those explicitly disclosed herein. When a game is executed, for example, animation or an operation icon designated by the program may be displayed on a screen of the terminal device 30. The player may enter an instruction for causing the game to progress using an input interface (e.g., a touch screen or a button) of the terminal device 30. The instruction entered by the player may be transmitted to the server device 10 through the browser of the terminal device 30 or a platform function such as NgCore™. The terminal device 30 may send information indicating various parameters (such as the number of game points earned and information concerning obtained items) used in the game, and information indicating the status of the game (such as information specifying which mission has been fulfilled) to the server device 10, if necessary. The server device 10 may manage the progress of the individual players in the game in accordance with information received from the plurality of terminal devices 30, such as instructions, information indicating the parameters, and information indicating the statuses. Thus, each player is able to resume the interrupted game from the point where it was interrupted, on the basis of the information concerning the progress of the game held in the server device 10.

Figure 3:
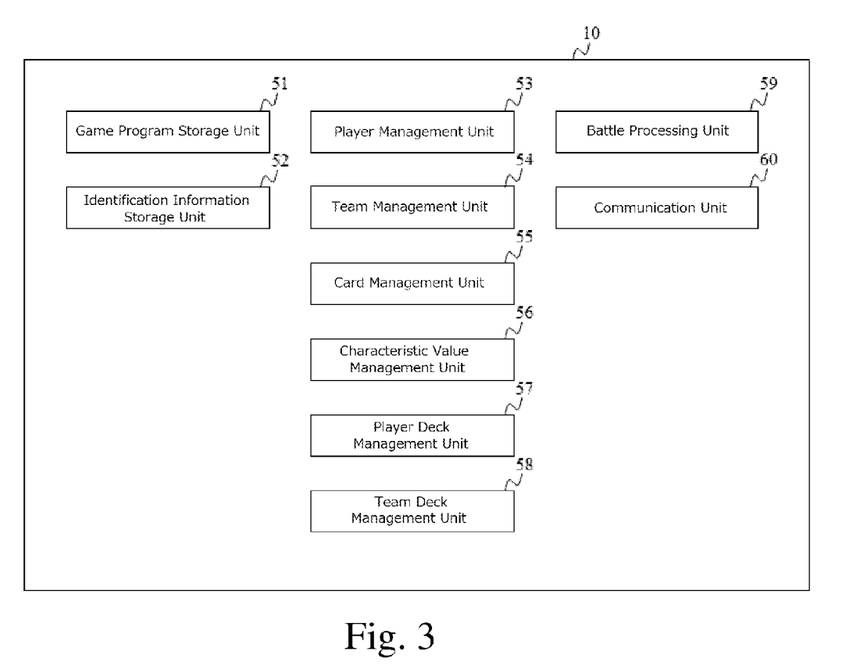
FIG. 3 is a block diagram illustrating the functionality of a server device 10 according to an embodiment of the present invention.

Next, the functionality of the server device 10 implemented by the components shown in FIG. 1 will be described with reference to FIG. 3. FIG. 3 is a block diagram illustrating the functionality of a server device 10 according to an embodiment of the present invention. As shown in FIG. 3, The server device 10 according to the embodiment includes a game program storage unit 51, an identification information storage unit 52, a player management unit 53, a team management unit 54, a card management unit 55, a characteristic value management unit 56, a player deck management unit 57, a team deck management unit 58, a battle processing unit 59, and a communication unit 60.

The game program storage unit 51 may store game programs for executing or operating various games executable or operable on the terminal device 30. A user of the terminal device 30 may obtain game programs stored on the game program storage unit 51 and run the obtained game programs on the terminal device 30, thereby to play the game on the terminal device 30. As stated above, various games may be performed on the terminal device 30. The games performed on the terminal device 30 may use various game contents such as electronic cards, items, and virtual currency used in the games.

The term "game contents" collectively refers to electronic data used by players for progressing the games and including, for example, cards, items, avatars, and virtual currency. Cards serving as game contents may have, for example, characteristic values assigned thereto that are necessary for progression of the game (e.g., "game content name," "offensive value," "physical strength value," "defensive value," "rarity value," and "attribute value"). At least part of these characteristic values may be updated in accordance with progression of the game. A player can progress the game using the card having updated characteristic values. A game that uses a card as a game content may be called a card game. In the card game, a player can own one or more cards and use the cards to fulfill a mission and battle with other players and enemy characters, thereby progressing the game.

The identification information storage unit 52 may store various identification information managed by the player management unit 53, the team management unit 54, the card management unit 55, the characteristic value management unit 56, the player deck management unit 57, and the team deck management unit 58.

Figure 4:
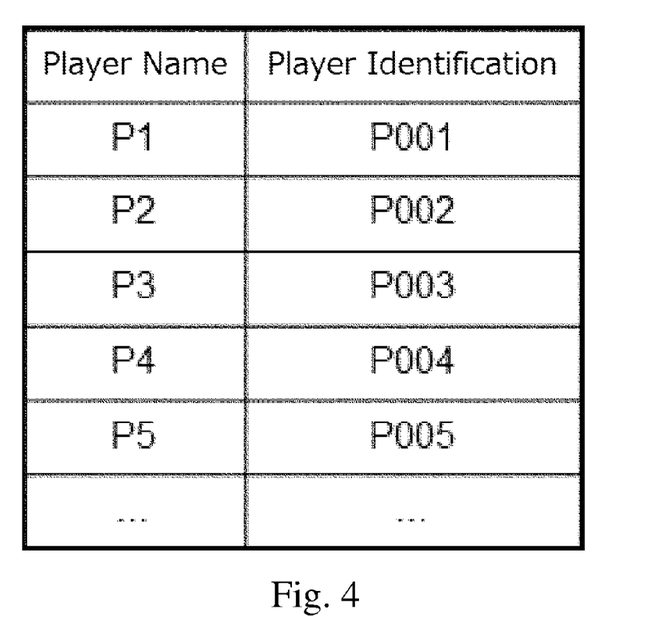
FIG. 4 schematically shows an example of a player management table managed by a player management unit 53 of the server device 10 according to an embodiment of the present invention.

The player management unit 53 may manage a plurality of players to be provided with a game from the server device 10. More specifically, the player management unit 53 may generate a management table (player management table) as shown in, e.g., FIG. 4, and the management table may be stored in the identification information storage unit 52. As shown in FIG. 4, the player management unit 53 may assign each player (e.g., player P1) a player identification (e.g., P001) identifying the player; the player identification may be stored in the identification information storage unit 52.

Figure 5:
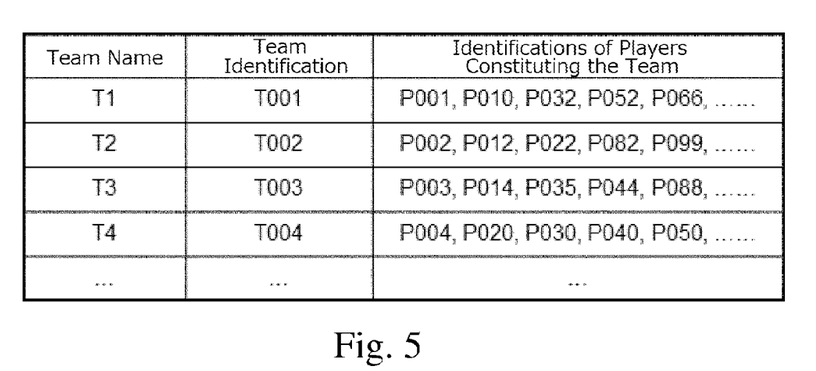
FIG. 5 schematically shows an example of a team management table managed by a team management unit 54 of the server device 10 according to an embodiment of the present invention.

The team management unit 54 may manage teams constituted by a plurality of players. More specifically, the team management unit 54 may generate a management table (team management table) as shown in, e.g., FIG. 5, and the management table may be stored in the identification information storage unit 52. As shown in FIG. 5, the team management unit 54 may assign each team (e.g., team T1) a team identification (e.g., T001) identifying the team and player identifications identifying the players constituting the team (P001, P010, P032, P052, and P066); these identifications may be stored in the identification information storage unit 52. The team management table may specify the players constituting a team.

Figure 6:
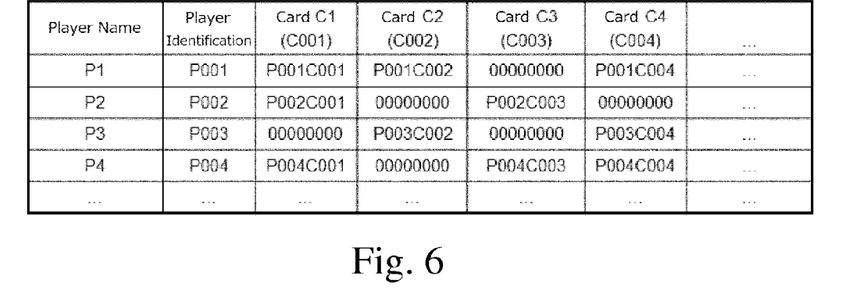
FIG. 6 schematically shows an example of a card management table managed by a card management unit 55 of the server device 10 according to an embodiment of the present invention.

The card management unit 55 may manage which cards are owned by players. More specifically, the card management unit 55 may generate a management table (card management table) as shown in, e.g., FIG. 6, and the management table may be stored in the identification information storage unit 52. As shown in FIG. 6, the card management unit 55 may assign each player (e.g., player P1) card identifications identifying the cards owned by the player; the card identifications may be stored in the identification information storage unit 52. In FIG. 6, player P1 and player P2 are respectively assigned card identifications P001C001 and P002C001 for the card C1 corresponding to, for example, soldier A. Player P3, who does not own this card, is assigned a card identification 00000000. The card management table may specify the cards owned by a player among cards usable in a game.

Figure 7:
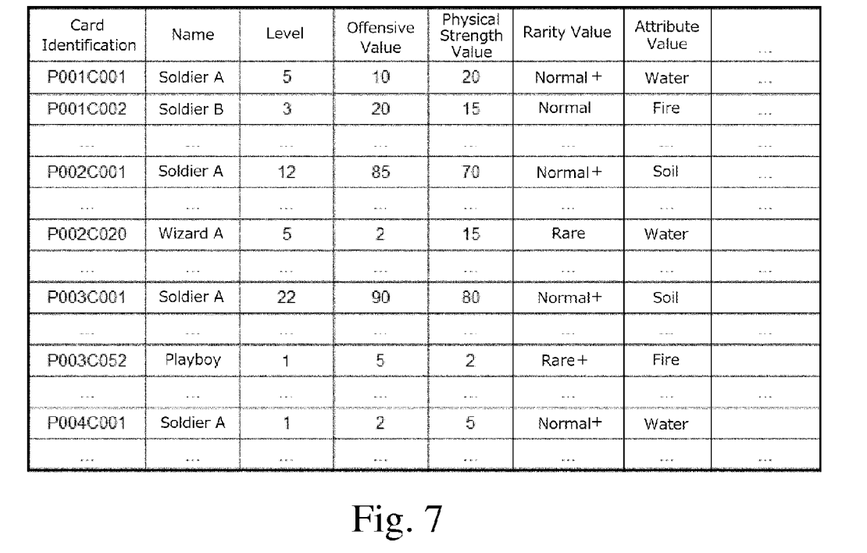
FIG. 7 schematically shows an example of a characteristic value management table managed by a characteristic value management unit 56 of the server device 10 according to an embodiment of the present invention.

The characteristic value management unit 56 may manage all the characteristic values assigned to cards owned by all the players. More specifically, the characteristic value management unit 56 may generate a management table (characteristic value management table) as shown in, e.g., FIG. 7, and the management table may be stored in the identification information storage unit 52. As shown in FIG. 7, the characteristic value management unit 56 may assign a plurality of characteristic values to each card, and the assigned characteristic values may be stored in the identification information storage unit 52. FIG. 7 shows examples of characteristic values: name, level, offensive value, physical strength value, rarity value, and attribute value. The characteristic value management table may specify how characteristic values of each card are currently set.

The player deck management unit 57 may handle the concept of "player deck." "A player deck" may be a card group (game content group) including cards (game contents) selected from cards (game contents) owned by a player, and used only by the player.

Figure 8:
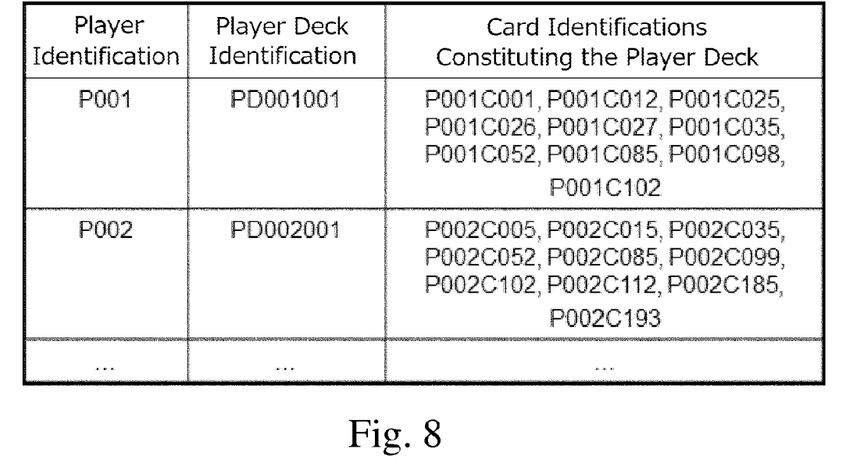
FIG. 8 schematically shows an example of a player deck management table managed by a player deck management unit 57 of the server device 10 according to an embodiment of the present invention.

The player deck management unit 57 may manage what player decks are owned by players. More specifically, the player deck management unit 57 may generate a management table (player deck management table) as shown in, e.g., FIG. 8, and the management table may be stored in the identification information storage unit 52. As shown in FIG. 8, the player deck management unit 57 may assign, to each player (e.g., player P1 identified by the player identification P001), a player deck identification (PD001001) identifying a player deck owned by the player, card identifications (P001C001, P001C012, P001C025, P001C026, P001C027, P001C035, P001C052, P001C085, P001C098, and P001C102) identifying cards constituting the player deck; and these identifications may be stored in the identification information storage unit 52. The player deck management table may specify which of the cards owned by the player constitute the player deck owned by the player.

The team deck management unit 58 may handle the concept of "team deck" proposed by the present application. "A team deck" may be a card group (game content group) including cards (game contents) selected from cards (game contents) owned by a plurality of players constituting a team, and used only by the team.

Figure 9:
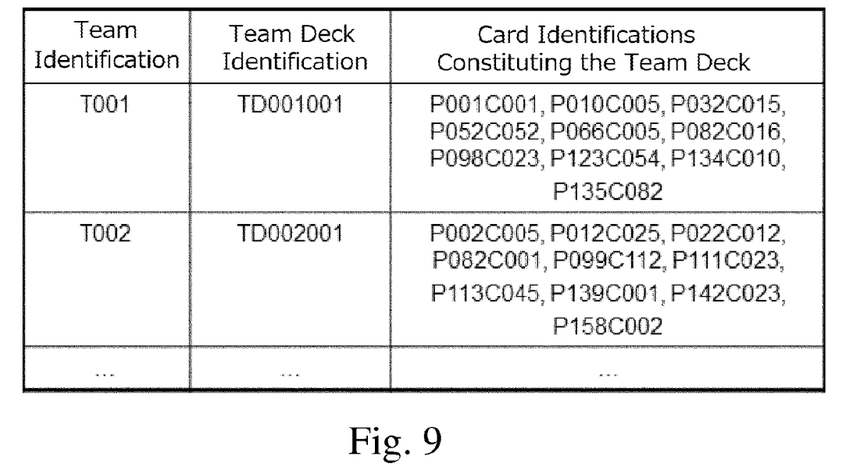
FIG. 9 schematically shows an example of a team deck management table managed by a team deck management unit 58 of the server device 10 according to an embodiment of the present invention.

The team deck management unit 58 may manage what team decks are owned by teams. More specifically, the team deck management unit 58 may generate a management table (team deck management table) as shown in, e.g., FIG. 9, and the management table may be stored in the identification information storage unit 52. As shown in FIG. 9, the team deck management unit 58 may assign, to each team (e.g., team T1 identified by the team identification T001), a team deck identification (TD001001) identifying a team deck owned by the team and card identifications (P001C001, P0100005, P032C015, P052C052, P066C005, P082C016, P098C023, P123C054, P134C010, and P135C082) identifying the cards constituting the team deck; and these identifications may be stored in the identification information storage unit 52. The team deck management table may specify which cards owned by which players constitute the team deck owned by the team.

The battle processing unit 59 may process a battle between one team and another team. More specifically, the battle processing unit 59 may compare evaluation values calculated by using characteristic values assigned to cards constituting a team deck owned by one team and/or cards constituting a player deck of a player included in the team, with evaluation values calculated by using characteristic values assigned to cards constituting a team deck owned by another team and/or cards constituting a player deck of a player included in the other team, thereby to process a battle between the two teams.

The communication unit 60 may receive a card identification from each of the players constituting a team, the card identification identifying a card selected by the player to be included in the team deck. Further, the communication unit 60 may send, to each of the players, card identifications identifying the cards selected by other players to be included in the team deck.

Each of the above described management tables are mere examples and may be replaced with other desired techniques to achieve the purpose of identifying players, teams, players constituting teams (specific players), cards, player decks, cards constituting player decks, team decks (specific card groups), cards constituting team decks (specific cards), and characteristic values assigned to the cards.

Figure 10:
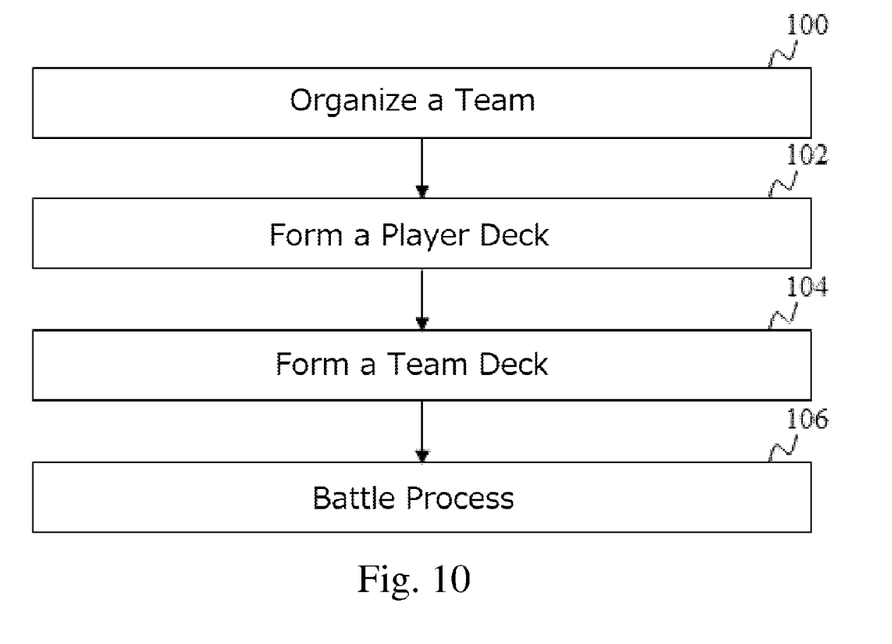
FIG. 10 is a flow diagram showing an operation performed during a game play by the server device 10 according to an embodiment of the present invention.

Next, reference is made to FIG. 10 to describe how the above server device 10 provides a game to each player. FIG. 10 is a flow diagram showing an operation performed during a game play by the server device 10 according to an embodiment of the present invention. By way of an example, the following description assumes that team T1 attacks team T2 in a battle (that is, team T1 is an offense team and team T2 is a defense team).

As shown in FIG. 10, team T1 and team T2 are organized in step 100. Each of the teams includes a plurality of players. A team may be organized, for example, as follows. i) A list of teams that a player can join is displayed on the terminal device 30 of the player, and the player selects a preferable team from the list to join the team. ii) The server device 10 assigns each player to a certain team in accordance with a condition or in a random manner. The total number of players constituting a team is not limited; by way of an example, each team in this embodiment includes ten players.

When team T1 and team T2 are organized, the team management unit 54 of the server device 10 may manage team T1 and team T2 by using the team management table as shown in FIG. 5, wherein the team identifications identifying the teams and the identifications of the players constituting the teams may be associated with each other.

Next, in step 102, players constituting each team may form player decks to be used by the players themselves. In this embodiment, each player may select ten cards from his own cards to form a player deck. When each player has formed a player deck, the player deck management unit 57 of the server device 10 may manage the player deck of each player constituting each team by using the player deck management table as shown in FIG. 8, wherein a player identification identifying the player, a player deck identification identifying the player deck of the player, and card identifications identifying the cards constituting the player deck are associated with one another.

The player deck may also be formed by the player deck management unit 57 instead of allowing each player to form his own player deck; in this case, the player deck management unit 57 may select cards from the player's cards in accordance with a certain criterion (e.g., a criterion that cards of which a certain characteristic value is high should be preferentially selected) or in a random manner.

Next, in step 104, each team may form a team deck to be used by the team. In this embodiment, each player may select one card to be provided to the team deck, from his own cards. Therefore, a team deck of each team may include ten cards. The total number of cards constituting a team deck and/or the total number of cards that can be selected by each player to be provided to the team deck is not limited and may be desirably set. For example, a player belonging to a team may select a plurality of cards to be provided to the team deck; and another player belonging to the team may provide no card to the team deck.

When each team has formed a team deck, the team deck management unit 58 of the server device 10 may manage the team deck of each team by using the team deck management table as shown in FIG. 9, wherein a team identification identifying the team, a team deck identification identifying the team deck, and card identifications identifying the cards constituting the team deck may be associated with one another.

The team deck may also be formed by the team deck management unit 58 instead of allowing each player to select a card to be provided to the team deck; in this case, the team deck management unit 58 may select cards from the player's cards in accordance with a certain criterion (e.g., a criterion that cards of which a certain characteristic value is high should be preferentially selected) or in a random manner.

Next, in step 106, team T1 and team T2 may battle with each other. This battle may be performed in various aspects.

Figure 11:
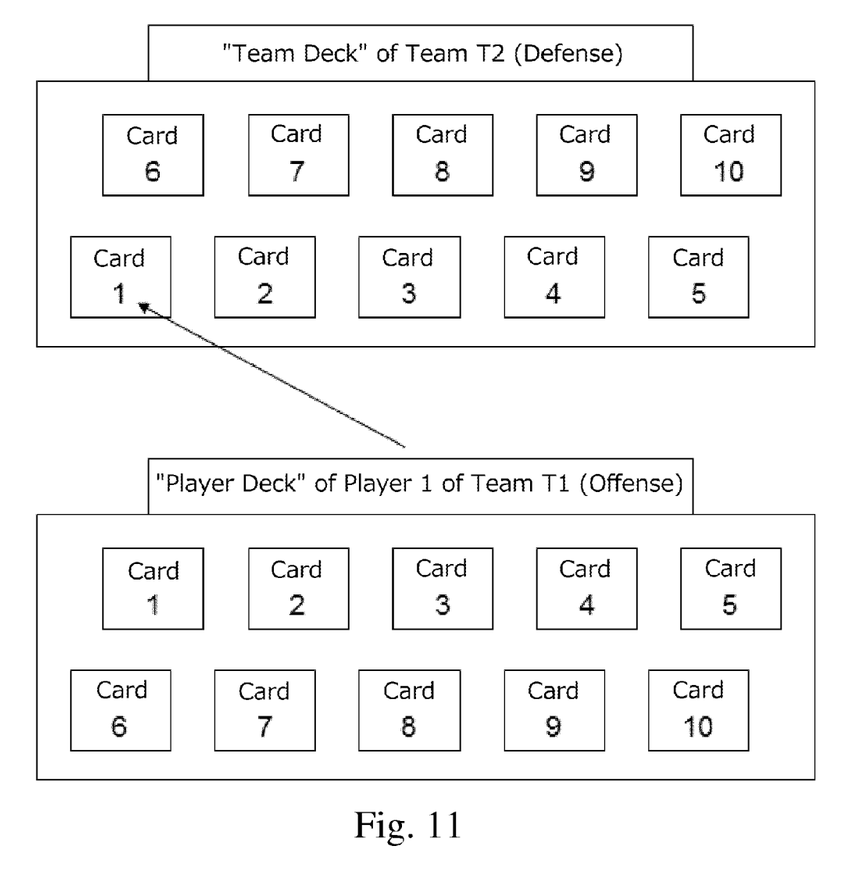
FIG. 11 is a schematic diagram showing a specific example of battling method provided by the server device 10 according to an embodiment of the present invention.

In one embodiment of the present invention, each of team T1 and team T2 may own a team deck. Players of team T1 may attack the team deck of team T2 in cooperation with each other, by using their own player decks. Meanwhile, players of team T2 may attack the team deck of team T1 in cooperation with each other, by using their own player decks. By way of an example, the winning condition of a team may be as follows. i) The team that has first defeated all the game cards constituting the team deck of the opposing team shall be the winning team. ii) Each team is provided with points in accordance with the damage imparted on the team deck of the opposing team or the number of defeated cards of the opposing team, and the team that has earned more points shall be the winning team. This embodiment will be hereinafter mainly described in view of player 1 among the ten players constituting team T1 (the same applies in view of other players of team T1 and players of team T2). FIG. 11 is a schematic diagram showing a specific example of battling method provided by the server device 10 according to the embodiment. When player 1 of team T1 starts a battle over the team deck of team T2, the display of the terminal device 30 of player 1 may display the team deck of team T2 in the upper portion and the player deck of player 1 in the lower portion, as shown in FIG. 11.

As described above, the team deck of team T2 displayed in the upper portion may be formed of cards each provided by a different player of team T2. Cards 1 to 10 of team T2 may be provided by player 1 to 10 of team T2, respectively. The player deck of player 1 of team T1, which is displayed in the lower portion, may be formed of ten cards selected from cards owned by player 1, as described above.

Figure 12:
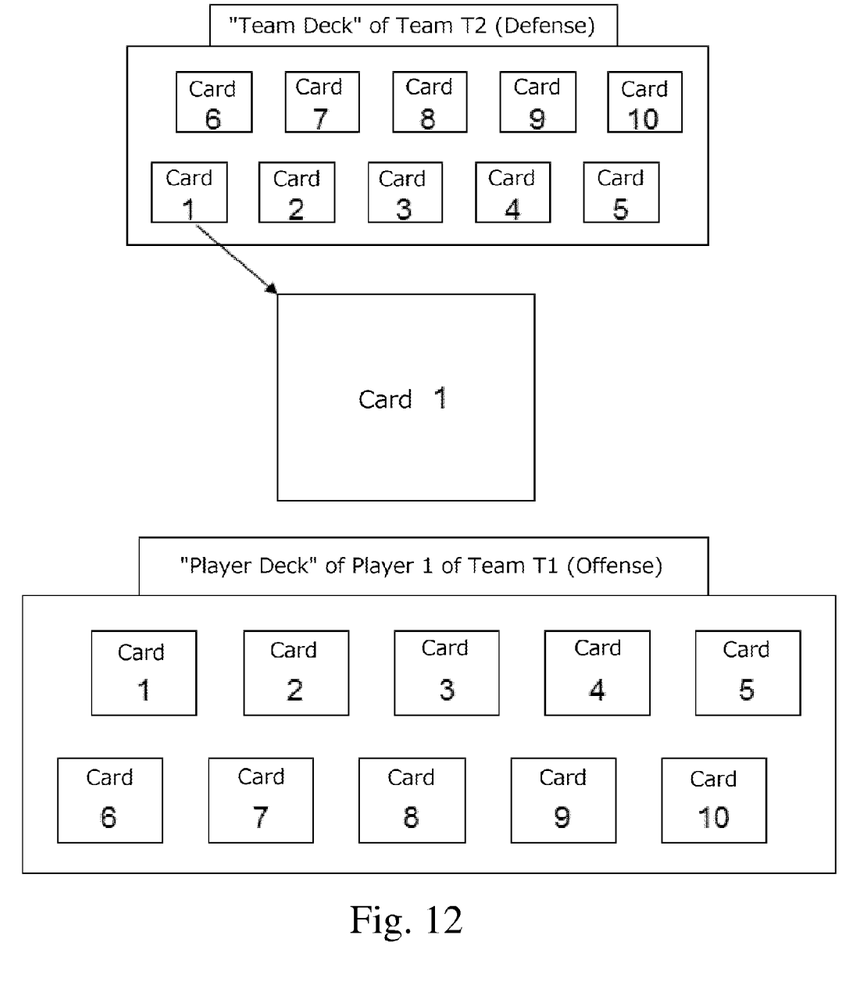
FIG. 12 shows a specific example of a battle screen displayed on the terminal device 30 according to an embodiment of the present invention.

As shown by the arrow in FIG. 11, player 1 may battle with card 1 (provided by player 1 of team T2) among ten cards constituting the team deck of team T2. By way of an example, a card to battle with player 1 of team T1 may be determined as follows: the battle processing unit 59 of the server device 10 randomly selects one card from the team deck of team T2 for each battle; the battle processing unit 59 draws cards from the team deck of team T2 in a predetermined order; or the battle processing unit 59 causes player 1 of team T1 to select a card from the team deck of team T2. In the battle between the player deck of player 1 of team T1 and card 1 of team T2, card 1 of team T2 may be displayed as an enemy character (raid boss) on the terminal device 30 of player 1 of team T1. That is, as shown in FIG. 12, the terminal device of player 1 of team T1 may display a screen wherein the player deck of player 1 of team T1 faces card 1 of team T2 displayed in a large size. In this battle, the battle processing unit 59 of the server device 10 may compare "total offensive value" (evaluation values), which is a total of "offensive values" of cards 1 to 10 of player 1 of team T1, with "physical strength value" (evaluation value) corresponding to "rarity value" assigned to card 1 of team T2. By way of an example, the physical strength value corresponding to the rarity value may be calculated as follows: the identification information storage unit 52 stores a conversion table that associates rarity values and physical strength values, and the battle processing unit 59 converts a rarity value of a card into a physical strength value in accordance with this conversion table. For example, the conversion table may associate "rarity values" at i) normal, ii) normal+, iii) rare, iv) rare+, and v) super rare levels with "physical strength values" of 1000, 2000, 3000, 4000, and 10000, respectively. The "physical strength value" corresponding to the "rarity value" assigned to card 1 of team T2 may be different from the intrinsic physical strength value of card 1 of team T2. For example, the "physical strength value" corresponding to the "rarity value" may be set to a value significantly higher than the intrinsic physical strength value of the card, such that the card can oppose a player deck including of a plurality of cards. In the first turn of a battle, calculations may be performed as described above to obtain the total offensive value of the player deck of player 1 of team T1 and a physical strength value corresponding to the rarity value of card 1 of team T2, and thereby to calculate the "physical strength value" minus the "total offensive value." The "physical strength value" may be updated to this calculation result. The same calculation is performed in the second and the third turns. The total number of turns is not limited to three but may be any desired number.

If the "physical strength value" minus the "total offensive value" falls to or below zero during the period from the first turn to the third turn, player 1 of team T1 shall win the battle. If card 1 of team T2 is displayed as a raid boss, a flash movie representing that player 1 has won the battle may be displayed on the terminal device 30 of player 1 of team T1, followed by the screen shown in FIG. 11. Then, card 1 may be darkened or removed from the team deck of team T2 shown in FIG. 11. Meanwhile, if "physical strength value" minus "total offensive value" is greater than zero when the third turn has been over, player 1 of team T1 shall be defeated by card 1 of the team deck of team T2. In this case, a flash movie representing that player 1 has lost the battle may be displayed on the terminal device 30 of player 1 of team T1, followed by the screen shown in FIG. 11. In the screen shown in FIG. 11, card 1 of the team deck of team T2 still remains. The game may be configured such that player 1, who has lost the battle, may challenge card 1 of the team deck of team T2 again. Simultaneously, a penalty may be assigned to player 1, wherein the server device 10 may store the information representing that player 1 has lost the battle and prohibit player 1 from performing a battle for a certain period of time.

When player 1 of team T1 wins the battle, player 1 of team T1 can subsequently battle with another card of the team deck of team T2. The card to perform a battle with player 1 of team T1 may be determined in the method described above. Additionally, the outcome of the battle may be determined as described above. When a player of team T1 other than player 1 (any of players 2 to 10 of team T1) accesses the server device 10 to perform the battle, the screen shown in FIG. 11 may be displayed on the terminal devices 30 of players 2 to 10 of team T1 wherein card 1 has been removed from the team deck of team T2. Accordingly, players 2 to 10 of team T1 may battle with the rest of the cards (cards 2 to 10) of the team deck of team T2. Thus, players 1 to 10 of team T1 may tackle a common target of the team deck of team T2; therefore, the members of the team may share a sense of cooperation for progressing the game.

If all the cards constituting the team deck of team T2 have been defeated (or the points earned by team T1 have become greater than the points of team T2), a win of team T1 (a defeat of team T2) may be determined. Conversely, if all the cards constituting the team deck of team T1 have been defeated (or the points earned by team T2 have become greater than the points of team T1), a win of team T2 (a defeat of team T2) may be determined. Then, the winning team can advance to the next stage if it is in a tournament. Additionally, each of the players belonging to the winning team may be provided with in-game money or a game content such as an item. Further, each of the players belonging to the winning team may have the characteristic values (e.g., level, offensive value, and/or physical strength value) of his card (e.g., a card included in the team deck used in the battle) increased. Such alteration of characteristic values may be achieved by, for example, the characteristic value management unit 56 rewriting the characteristic value management table as shown in FIG. 7.

Thus, each of team T1 and team T2 may form a team deck including cards selected from the cards owned by the players constituting the team and battles with the other team using the team deck. The players can have a sense of unity with other players included in the same team in a battle with the other team. That is, each of the players included in a team may select a card to be provided to a team deck, and this selection significantly impacts the outcome of the battle. For example, when providing a card having a high rarity, a player may significantly contribute to a win of his team; and when providing a card having a low rarity, the player may inhibit a win of his team. Accordingly, each player can have a sense of community or a sense of unity with other players.

Figure 13:
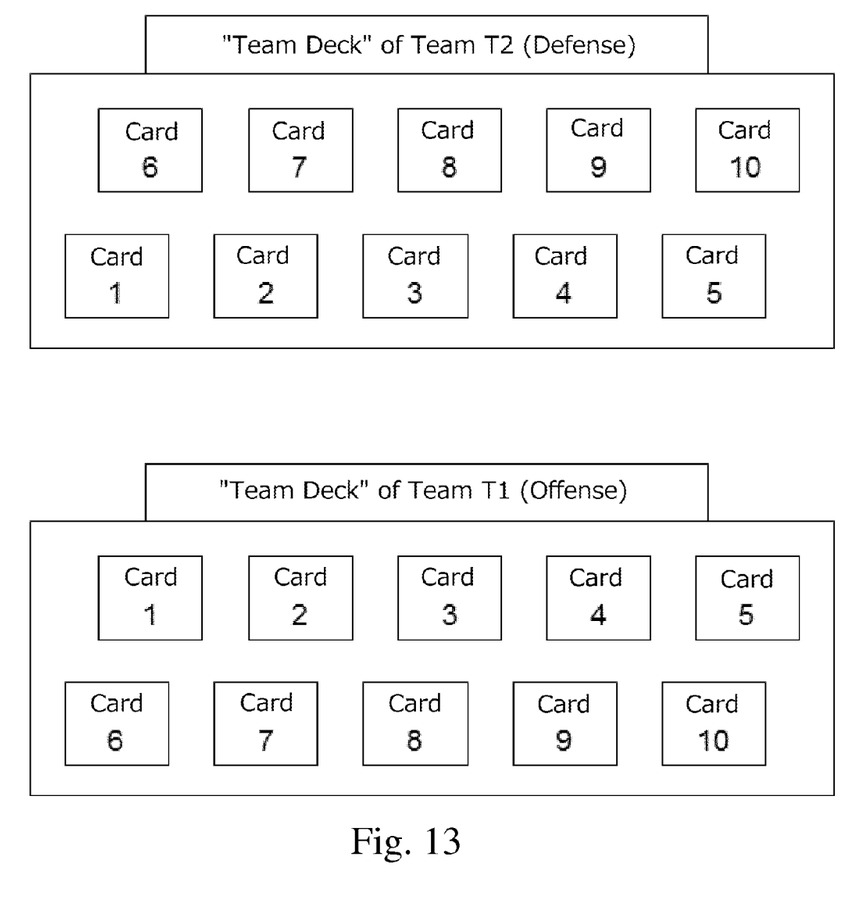
FIG. 13 is a schematic diagram showing another specific example of battling method provided by the server device 10 according to an embodiment of the present invention.

Next, the battling method shown in FIG. 11 may be replaced with the battling method shown in FIG. 13. FIG. 13 is a schematic diagram showing another specific example of battling method provided by the server device 10 according to an embodiment of the present invention.

In FIG. 13, the upper portion may display the team deck of team T2, the defense team; and the lower portion may display the team deck of team T1, the offense team. Thus, both the defense team and the offense team use their own team decks.

As described above, the team deck of team T2 displayed in the upper portion may be formed of cards each provided by a different player of team T2. Cards 1 to 10 may be provided by player 1 to 10 of team T2, respectively. Likewise, the team deck of team T1 displayed in the lower portion may also be formed of cards each provided by a different player of team T1. Cards 1 to 10 may be provided by player 1 to 10 of team T1, respectively.

In the battle shown in FIG. 13, the battle processing unit 59 of the server device 10 may compare a total offensive value (evaluation value) which is the total of offensive values assigned to cards 1 to 10 constituting the team deck of team T1, the offense team, with a total physical strength value (evaluation value) which is the total of physical strength values assigned to cards 1 to 10 constituting the team deck of team T2, the defense team. If the total offensive value is greater than the total physical strength value, team T1 may win; in contrast, if the total offensive value is equal to or smaller than the total physical strength value, team T2 may win.

Thus, each of team T2, the defense team, and team T1, the offense team, may form a team deck including cards selected from the cards owned by the players constituting the team and battle with the other team using the team deck. The players included in these teams can have a sense of unity with other players included in the same team in a battle with the other team. Particularly, each of the players may select a card to be provided to a team deck, and this selection significantly impacts the outcome of the battle. For example, when a player included in team T1, the offense team (team T2, the defense team) provides a card having a high offensive value (high physical strength value), the player can significantly contribute to a win of team T1 (team T2); in contrast, when the player provides a card having a low offensive value (low physical strength value), the player may inhibit a win of team T1 (team T2). Accordingly, each player can have a sense of community or a sense of unity with other players.

The battling method and the battle process described with reference to FIGS. 11 and 13 are mere examples; team decks (or player decks if necessary) may be used in any desired method for a battle between one entity and another entity, wherein desired characteristic values assigned to cards included in the team decks (or player decks if necessary) may be used to calculate evaluation values for each of the entities, and the evaluation values may be compared to process the battle between the entities.

Figure 14:
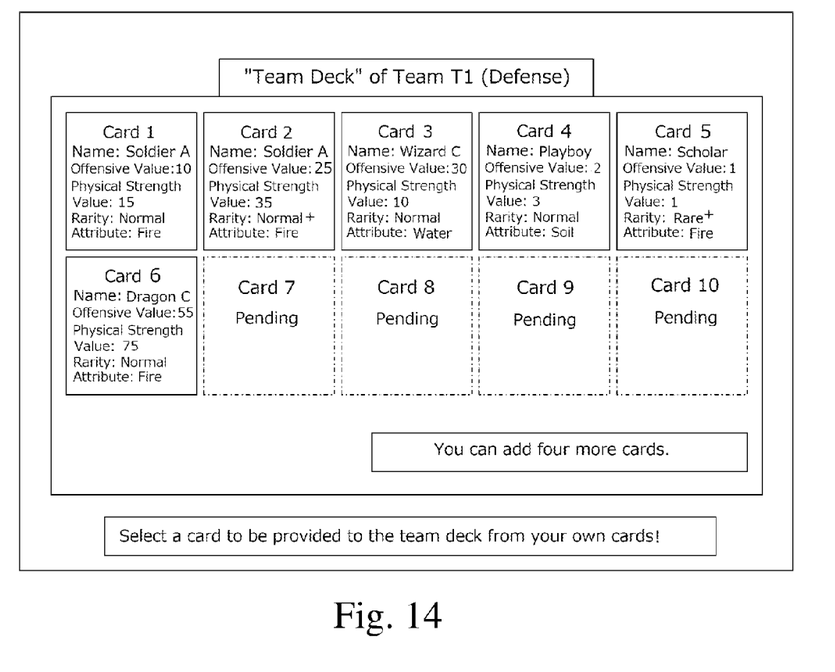
FIG. 14 shows a concrete example of a screen displayed on the terminal device 30 according to an embodiment of the present invention.

Next, reference is made to FIG. 14 to describe an example of screen displayed on the terminal device 30 of a player who selects a card to be provided to the team deck from his own cards. FIG. 14 shows a concrete example of a screen displayed on the terminal device 30 according to an embodiment of the present invention.

As shown in FIG. 14, the screen displayed on the terminal device 30 of the player may contain cards (cards 1 to 6) selected by other players (and the player himself) to be provided to the team deck of team T1. Cards 7 to 10, which are not yet selected, are not displayed.

As shown in FIG. 14, cards 1 to 6 are displayed along with their characteristic values such as card name, offensive value, physical strength value, rarity value, and attribute value. Such a screen can be displayed by, for example, the following process: the communication unit 60 of the server device 10 shown in FIG. 3 may receive, from the players included in team T1, card identifications identifying cards selected by these players, read out the characteristic values assigned to the card identifications from the characteristic value management table shown in FIG. 7 with search keys of the received card identifications, and send the characteristic values to each of the players.

On viewing the screen shown in FIG. 14, each of the players can grasp what cards are provided to the team deck by other players. Thus, the players can determine what card to provide so as to compensate the deficiency of the team deck or to enhance the advantage thereof. For example, when the battle is performed in the manner shown in FIG. 11, the player may select a card having a rarity value of "Super Rare" from his own cards, because the team deck has almost no cards having a high rarity value (i.e., it has many cards having a low physical strength value in accordance with the rarity value) and is powerless in defense. Additionally, when the battle is performed in the manner shown in FIG. 13, the player may select a card (or cards) having a high offensive value and defensive value from his own cards, because the team deck has almost no cards having a high offensive value and physical strength value and is powerless in offense and defense.

Further, there may be a rule that a special ability is developed depending on the affinity between cards provided to the team deck. For example, in a battle process in step 106 shown in FIG. 10, the battle processing unit 59 of the server device 10 shown in FIG. 3 may calculate an evaluation value for a team deck (or cards included in the team deck) based on the correlation (commonness, oppositeness, or affinity) between a certain characteristic value assigned to a card included in the team deck and the certain characteristic value assigned to another card included in the team deck. More specifically, when two cards have a common attribute value (e.g., "fire"), the battle processing unit 59 may temporarily increase the offensive value, physical strength value, and rarity value assigned to these cards and calculate an evaluation value for the team deck (or cards included in the team deck); and conversely, when two cards have opposite attribute values (e.g., "fire" and "water"), the battle processing unit 59 may temporarily decrease the offensive value, physical strength value, and rarity value assigned to these cards and calculate an evaluation value for the team deck (or cards included in the team deck). Thus, the players can select a card to be provided to the team deck in accordance with the correlation in characteristic values between a plurality of cards. For example, when many of the cards provided have an attribute value of "fire," the players can select a card having an attribute value of "fire" from their own cards.

Thus, players can select his own card to be provided to the team deck while viewing the cards selected by other players. Such selection may enhance the strategies in the game.

Additionally, the above embodiment was described for the case where each of the entities in a battle is a team constituted by a plurality of players. However, at least one of these entities may be an enemy character controlled by a computer and/or one player.

The processes and procedures described and illustrated herein may be implemented by software, hardware, or any combination thereof, in addition to those explicitly stated in the embodiments. More specifically, the processes and procedures described and illustrated herein may be implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

If the processes and procedures have been described and illustrated herein to be executed by a single device, software, component, or module, such processes or procedures may also be executed by a plurality of devices, a plurality of pieces of software, a plurality of components, and/or a plurality of modules. Even if the data, tables, or databases described in the specification are stored in a single memory in the description, the data, tables, or databases may be dispersed and stored in a plurality of memories included in a single apparatus or in a plurality of memories dispersed and arranged in a plurality of apparatuses. The elements of the software and the hardware described in the specification can be integrated into fewer constituent elements or can be decomposed into more constituent elements.

With respect to the use of substantially any plural and/or singular terms herein, in addition to terms used without designation of being either plural or singular, those having skill in the art can translate from the plural to the singular and/or from the singular to the plural as is appropriate to the context.

What is claimed is:

1. A server device comprising:
   a processor; and
   at least one memory device configured to store instructions which when executed by the processor, cause the server device to:
   manage a first team of players and an opponent of the first team of players, wherein one or more players in the first team and the opponent of the first team are identified to own game contents;
   manage a first set of team-use game contents for the first team and a second set of team-use game contents for the opponent of the first team, wherein the team-use game contents in the first set are from the game contents owned by the one or more players in the first team and the team-use game contents in the second set are from the game contents owned by the one or more players in the opponent of the first team;
   manage sets of player-use game contents for the individual players in the first team, wherein the sets of player-use game contents include a given set of player-use contents owned by a given player in the first team, the player-use contents in the given set being from game contents owned by the given player;
   manage sets of player-use game contents for the individual players in the opponent of the first team, wherein the sets of player-use game contents include a given set of player-use contents owned by a given player in the opponent of the first team, the player-use contents in the given set being from game contents owned by the given player; and
   process a battle between the opponent of the first team and the first team, wherein processing the battle between the opponent of the first team and the first team comprises:
      comparing a first evaluation value associated with the opponent of the first team with a second evaluation value associated with the first team, the first evaluation value being calculated according to a first rule based on a characteristic associated with a game content in the first set of team-use game contents managed by the team deck unit for the first team and the second evaluation value being calculated based on a characteristic associated with a game content in the second set of team-use game contents for the opponent of the first team,
      determining a result of a first stage of the battle based on the comparison of the first evaluation value and second evaluation value,
      comparing a third evaluation value associated with the opponent of the first team with a fourth evaluation value associated with the first team, the third evaluation value being calculated according to a second rule based on a characteristic value associated with a game content owned by the opponent of the first team and the fourth evaluation value being calculated according to a characteristic value associated with a game content in a set of player-use contents managed by the player deck unit for a player in the first team, and
      determining a result of a second stage of the battle based on the comparison of the third evaluation value and fourth evaluation value.

2. The server device of claim 1, wherein the team-use game contents in the first set for the first team are designated as such by the one or more players in the first team among the game contents owned by the one or more players.

3. The server device of claim 1, wherein the player-use game contents in the given set are designated as such by the given player among the game contents owned by the given player.

4. The server device of claim 1, wherein the calculation of the second evaluation value is further based on a total of the characteristic values associated with all the player-use game contents included in the first set or a total of the characteristic values associated with all the player-use game contents included in the given set for the given player.

5. The server device of claim 1, wherein the calculation of the second evaluation value is further based on a relationship between team-use game contents in the first set.

6. The server device of claim 1, wherein the opponent of the first team attacks the first team in the first battle stage, and the first team attacks the opponent of the first team in the second battle stage.

7. The server device of claim 1, wherein a given game content owned by the given user includes an electronic card, a virtual item, a character, and virtual currency in a video game.

8. The server device of claim 1, wherein the characteristic value associated with a game content includes a value indicating an offensive strength, a physical strength, a defensive strength, a rarity level, and/or an attribute associated with the game content.

9. The server device of claim 1, wherein the opponent of the first team attacks the first team in the second battle stage, and the first team attacks the opponent of the first team in the first battle stage.

10. A method for processing a battle in a video game, the method being implemented in one or more processors configured to execute computer programs, the method comprising:

managing by the one or more processors a first team of players and an opponent of the first team of players, wherein one or more players in the first team and the opponent of the first team are identified to own game contents;

managing by the one or more processors a first set of team-use game contents for the first team and a second set of team-use game contents for the opponent of the first team, wherein the team-use game contents in the first set are from the game contents owned by the one or more players in the first team and the team-use game contents in the second set are from the game contents owned by the one or more players in the opponent of the first team;

managing by the one or more processors sets of player use game contents for the individual players in the first team, wherein the sets of player-use game contents include a given set of player-use contents owned by a given player in the first team, the player-use contents in the given set being from game contents owned by the given player;

managing by the one or more processors sets of player use game contents for the individual players in the opponent of first team, wherein the sets of player-use game contents include a given set of player-use contents owned by a given player in the opponent of first team, the player-use contents in the given set being from game contents owned by the given player; and processing by the one or more processors a battle between the opponent of the first team and the first team, wherein processing the battle between the opponent of the first team and the first team comprises:

comparing a first evaluation value associated with the opponent of the first team with a second evaluation value associated with the first team, the first evaluation value being calculated according to a first rule based on a characteristic associated with a game content in the first set of team-use game contents managed by the team deck unit for the first team and the second evaluation value being calculated based on a characteristic associated with a game content in the second set of team-use game contents for the opponent of the first team, determining a result of a first stage of the battle based on the comparison of the first evaluation value and second evaluation value, comparing a third evaluation value associated with the opponent of the first team with a fourth evaluation value associated with the first team, the third evaluation value being calculated according to a second rule based on a characteristic value associated with a game content owned by the opponent of the first team and the fourth evaluation value being calculated according to a characteristic value associated with a game content in a set of player-use contents managed by the player deck unit for a player in the first team, and determining a result of a second stage of the battle based on the comparison of the third evaluation value and fourth evaluation value.

* * * * *